US009177070B2

(12) United States Patent
McFarlane et al.

(10) Patent No.: US 9,177,070 B2
(45) Date of Patent: *Nov. 3, 2015

(54) SYSTEM, METHOD AND COMPUTER PROGRAM PRODUCT FOR PERFORMING ACTIONS ASSOCIATED WITH A PORTAL

(75) Inventors: Patrick McFarlane, San Francisco, CA (US); Ganesh Mathrubootham, Fremont, CA (US); Shuchun Yang, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 611 days.

This patent is subject to a terminal disclaimer.

(21) Appl. No.: 13/165,714

(22) Filed: Jun. 21, 2011

(65) Prior Publication Data

US 2011/0314420 A1    Dec. 22, 2011

Related U.S. Application Data

(60) Provisional application No. 61/357,080, filed on Jun. 21, 2010.

(51) Int. Cl.
*G06F 3/00* (2006.01)
*G06F 3/048* (2013.01)
*G06F 17/30* (2006.01)
*G06F 3/0484* (2013.01)
*G06F 3/0481* (2013.01)

(52) U.S. Cl.
CPC ........ *G06F 17/30873* (2013.01); *G06F 3/0481* (2013.01); *G06F 3/0484* (2013.01)

(58) Field of Classification Search
CPC ............ G06F 3/1287; G06F 17/30849; G06F 17/30274; G06F 17/30781; G06F 3/147; G06Q 50/01; H04L 67/306; H04N 21/2743; H04N 21/8549
USPC .................. 715/741, 742, 745, 811, 719–726
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |

(Continued)

OTHER PUBLICATIONS

Non-Final Office Action from U.S. Appl. No. 13/874,387, dated Jan. 9, 2015.

(Continued)

*Primary Examiner* — Pei Yong Weng
(74) *Attorney, Agent, or Firm* — Zilka-Kotab, PC

(57) ABSTRACT

Provided are mechanisms and methods for performing actions associated with a portion of portal content provided to a user. These mechanisms and methods for performing the actions associated with the portion of the portal content can enable an improved user experience, increased efficiency, optimized productivity, etc. Further, the actions associated with the portion of the portal content can include manipulations requested by the user, such as an addition to, a removal of, and a rearrangement of the portion of the portal content.

20 Claims, 8 Drawing Sheets

(56) References Cited

U.S. PATENT DOCUMENTS

| | | |
|---|---|---|
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,209,929 B2 | 4/2007 | Dominguez, Jr. et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,457,545 B2 | 6/2013 | Chan |
| 8,484,111 B2 | 7/2013 | Frankland et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0233404 A1 | 12/2003 | Hopkins |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065925 A1 | 3/2005 | Weissman et al. |
| 2005/0091098 A1 | 4/2005 | Brodersen et al. |
| 2005/0223022 A1 | 10/2005 | Weissman et al. |
| 2005/0283478 A1 | 12/2005 | Choi et al. |
| 2006/0021019 A1 | 1/2006 | Hinton et al. |
| 2006/0168541 A1* | 7/2006 | Hill et al. .................. 715/810 |
| 2006/0206834 A1 | 9/2006 | Fisher et al. |
| 2008/0172362 A1* | 7/2008 | Shacham et al. .................. 707/3 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0179879 A1* | 7/2010 | Cunningham et al. ..... 705/14.71 |
| 2011/0191163 A1* | 8/2011 | Allaire et al. ............. 705/14.39 |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0246927 A1 | 9/2013 | McFarlane et al. |
| 2013/0247216 A1 | 9/2013 | Cinarkaya et al. |
| 2013/0254180 A1 | 9/2013 | McFarlane et al. |
| 2013/0254671 A1 | 9/2013 | McFarlane et al. |
| 2014/0359537 A1 | 12/2014 | Jackobson et al. |
| 2015/0006289 A1 | 1/2015 | Jakobson et al. |

(56) References Cited

U.S. PATENT DOCUMENTS

| | | |
|---|---|---|
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |

OTHER PUBLICATIONS

Non-Final Office Action from U.S. Appl. No. 13/874,395, dated Feb. 13, 2015.

Non-Final Office Action from U.S. Appl. No. 13/874,384, dated Dec. 29, 2014.

* cited by examiner

SYSTEM, METHOD AND COMPUTER PROGRAM PRODUCT FOR PERFORMING ACTIONS ASSOCIATED WITH A PORTAL

CLAIM OF PRIORITY

This application claims the benefit of U.S. Provisional Patent Application 61/357,080, entitled "METHODS AND SYSTEMS FOR A PORTAL FRAMEWORK IN AN ONLINE DEMAND SERVICE ENVIRONMENT," by McFarlane et al., filed Jun. 21, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to data presentation, and more particularly to manipulation of presented data.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Conventional systems may desire to present data associated with the system to a user. For example, systems may retrieve system data from a database and present it to a user utilizing a display. Unfortunately, data presentation techniques have been associated with various limitations.

Just by way of example, traditional methods of presenting system data to a user may involve a static layout and static display of one or more data elements that may not be in a format preferred by the user, and may not convey information desired by the user. Additionally, the display may be slow to load due at least in part to one or more data requests associated with the display. Accordingly, it is desirable to allow a user to manipulate a display of presented system data and to optimize the presentation of such system data.

BRIEF SUMMARY

In accordance with embodiments, there are provided mechanisms and methods for performing actions associated with a portal. These mechanisms and methods for performing actions associated with a portal can enable an improved user experience, increased efficiency, optimized productivity, etc.

In an embodiment and by way of example, a method for performing actions associated with a portal is provided. In one embodiment, a request is received from a user to view a portal. Additionally, the portal is displayed to the user. Further, one or more actions associated with the portal are performed, based on user input.

While one or more implementations and techniques are described with reference to an embodiment in which performing actions associated with a portal is implemented in a system having an application server providing a front end for an on-demand database system capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for performing actions associated with a portal.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for performing actions associated with a portal will be described with reference to example embodiments.

Figure 1:
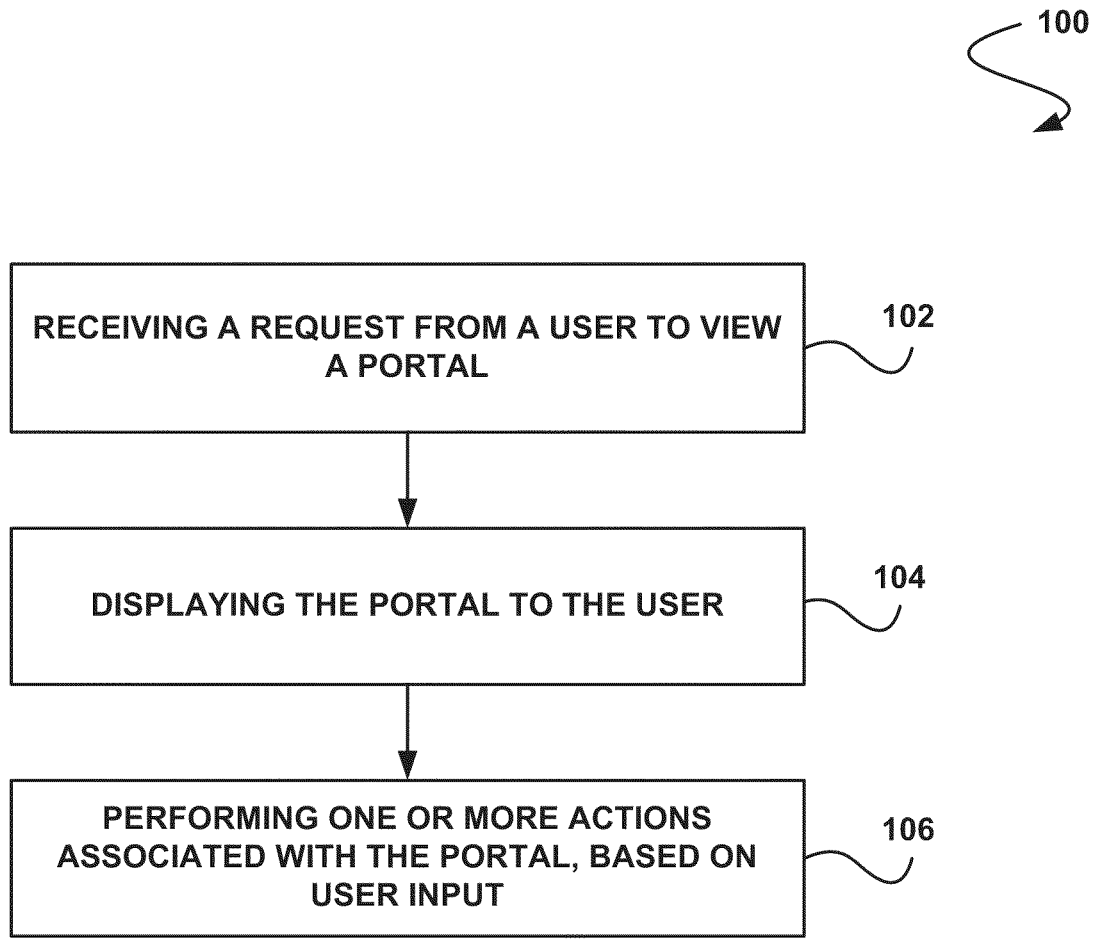
FIG. 1 illustrates a method for performing actions associated with a portal, in accordance with one embodiment.

FIG. 1 illustrates a method 100 for performing actions associated with a portal, in accordance with one embodiment. As shown in operation 102, a request is received from a user to view a portal. In one embodiment, the portal may include data retrieved from one or more sources. For example, the portal may include data from one or more databases, data from a multi-tenant on-demand database system, data from one or more web sites, etc.

Additionally, in one embodiment, the portal may include one or more web pages (e.g., one or more hypertext markup language (HTML) pages, etc.). In another embodiment, the request to view the portal may include login data associated with the user. For example, the request to view the portal may include a user name and password associated with a user account within a system that provides the portal that is input by the user utilizing a graphical user interface (GUI).

Further, in another embodiment, the request to view the portal may include an address of a location of the portal. For example, the request to view the portal may include a uniform resource locator (URL) that is input by the user into a web browser. In yet another embodiment, the request to view the portal may include a selection of a link to the portal. For example, the request to view the portal may include the selection of a link that is provided to the user by a search engine (e.g., an Internet-based search engine, etc.) as a result of a query input by the user into the search engine. In another example, the request to view the portal may include the selection of a link (e.g., a help link, etc.) within a web page of the provider of the portal.

Further still, in one embodiment, the portal may be associated with a multi-tenant on-demand database system. For example, the user may include a customer of the multi-tenant on-demand database system (e.g., an organization of the system, etc.), an employee of a customer of the multi-tenant on-demand database system, an administrator of a customer of a multi-tenant on-demand database system, etc., and the portal may provide information associated with such system to the user. In another embodiment, the portal may be provided by the multi-tenant on-demand database system.

Also, it should be noted that, as described above, such multi-tenant on-demand database system may include any service that relies on a database system that is accessible over a network, in which various elements of hardware and software of the database system may be shared by one or more customers (e.g. tenants). For instance, a given application server may simultaneously process requests for a great number of customers, and a given database table may store rows for a potentially much greater number of customers. Various examples of such a multi-tenant on-demand database system will be set forth in the context of different embodiments that will be described during reference to subsequent figures.

Additionally, as shown in operation 104, the portal is displayed to the user. In one embodiment, displaying the portal to the user may include requesting and retrieving data from one or more sources, which may then be presented to the user by the portal. For example, one or more applications, databases, etc. may be queried for data, and such data may be retrieved and presented to the user through the portal. In another embodiment, the retrieved data may be associated with the user. For example, the retrieved data may include user data retrieved from a database associated with a user's account, etc.

In another embodiment, the portal may provide one or more services to the user. For example, the portal may provide messaging services (e.g., electronic mail messaging, instant messaging, etc.) to the user. In another example, the portal may provide one or more search services (e.g., portal search, Internet search, etc.) to the user. In yet another embodiment, the portal may be displayed utilizing a web browser. For example, the portal may be displayed as one or more web pages within the web browser.

Further, in one embodiment, the portal may include one or more widgets (e.g., one or more portlets, gadgets, etc.) that are displayed through the portal. For example, the portal may include one or more applications that are executed within the portal. In another embodiment, each of the widgets displayed within the portal may be associated with particular data. For example, each widget may retrieve data from a specific source. In another example, each widget may display a certain type of data to the user. In yet another embodiment, the portal may include a plurality of columns, where each widget may be located within one of the plurality of columns.

Further still, in one embodiment, one of the widgets displayed through the portal may display data retrieved from a social media source. In another embodiment, one of the widgets displayed through the portal may display data associated with a knowledge base (e.g., a knowledge base of a multi-tenant on-demand database system, etc.). In yet another embodiment, one of the widgets displayed through the portal may display frequently asked questions (FAQs) associated with a system (e.g., FAQs associated with a multi-tenant on-demand database system, etc.). For example, the widget may display most popular FAQs, highest rated FAQs, etc. In still another embodiment, the widget may display training and/or certification information. For example, the widget may include a jumpstart widget that links to a training area associated with an organization of the user.

In another embodiment, the widget may include case information associated with the user. For example, the widget may display open tickets associated with the user, open cases associated with the user, terms associated with a contract, etc. In yet another embodiment, the widget may display information associated with a status of a system (e.g., a status of the user's local computer, a status of one or more servers, a status of a multi-tenant on-demand database system, etc.).

Also, in one embodiment, the widgets may be displayed to the user through the portal based on one or more privileges associated with the user. For example, the user may have an associated level of access (e.g., an access score, an associated role within an organization, etc.), and only widgets that correspond to the user's access score (e.g., widgets that have a score less than or equal to the user's access score, etc.) may be displayed to the user through the portal.

Additionally, in one embodiment, the widgets may be loaded in parallel with the portal. For example, a web page associated with the portal may load immediately in response to the request, and one or more widgets may load within the portal in parallel (e.g., via asynchronous data requests, etc.). In another embodiment, the widgets may be loaded within the portal after the portal is loaded. In yet another embodiment, the one or more widgets may be loaded within the portal according to one or more settings associated with the user. For example, one or more portal preferences associated with the user may be saved that describe which widgets are to be displayed to the user through the portal.

Further, as shown in operation 106, one or more actions associated with the portal are performed, based on user input. In one embodiment, the user input may include a user request to manipulate one or more elements associated with one or more widgets of the portal. For example, the user input may include one or more of the user selecting one or more widgets within the portal utilizing an icon of a GUI, dragging and dropping one or more widgets within the portal, selecting one or more icons within one or more widgets, etc.

Further still, in one embodiment, the one or more actions may include manipulating one or more widgets of the portal. For example, the one or more actions may include changing a location of a widget within the portal based on the user clicking and dragging the widget to a different location (e.g., a different columns, etc.) within the portal. In another example, the location of one or more widgets may be arranged within the portal by the user. In another embodiment, the location of a widget may be calibrated when the widget is moved. In yet another embodiment, the one or more actions may include adding and/or removing one or more widgets from the portal. For example, a widget may be added to the portal in response to the user selecting and dragging an icon associated with the widget from a toolbar of the portal to another location within the portal (e.g., a display area within the portal, etc.). In another example, a widget may be removed from the portal in response to a user selecting an icon within the widget (e.g., a removal icon, etc.).

Also, in one embodiment, the one or more actions may include displaying additional information within a widget of the portal. For example, an additional layer of a hierarchical widget may be displayed in response to the user selecting an icon next to a representation of the widget within the portal. In another example, additional information may be displayed within a widget in response to the user selecting a tab within the widget. In another embodiment, the one or more actions may include minimizing a widget that is shown within the portal. For example, the widget may be minimized within the portal in response to the user selecting an icon of the widget. In another embodiment, the one or more actions may include maximizing a minimized widget that is shown within the portal.

In addition, in one embodiment, one or more widgets of the portal may be categorized based on a common theme, pattern, etc. Additionally, one or more actions may be performed on all widgets of a certain categorization, based on user input. For example, only a top number of items may be shown in all widgets that include lists of items. In another example, only a certain number of columns may be shown for all widgets that include tables. In yet another example, all widgets of a certain categorization may be removed, maximized, etc. based on the user input.

In another embodiment, the one or more actions may include manipulating one or more elements of the portal layout. For example, one or more columns of the portal may be added, removed, or adjusted in response to the user input. In another embodiment, one or more preferences associated with the user input may be saved. For example, after performing the one or more actions, the state of the portal may be saved to memory. Additionally, the saved state may be later used to recreate the preferences of the user within the portal when the user logs on at a later time.

Figure 2:
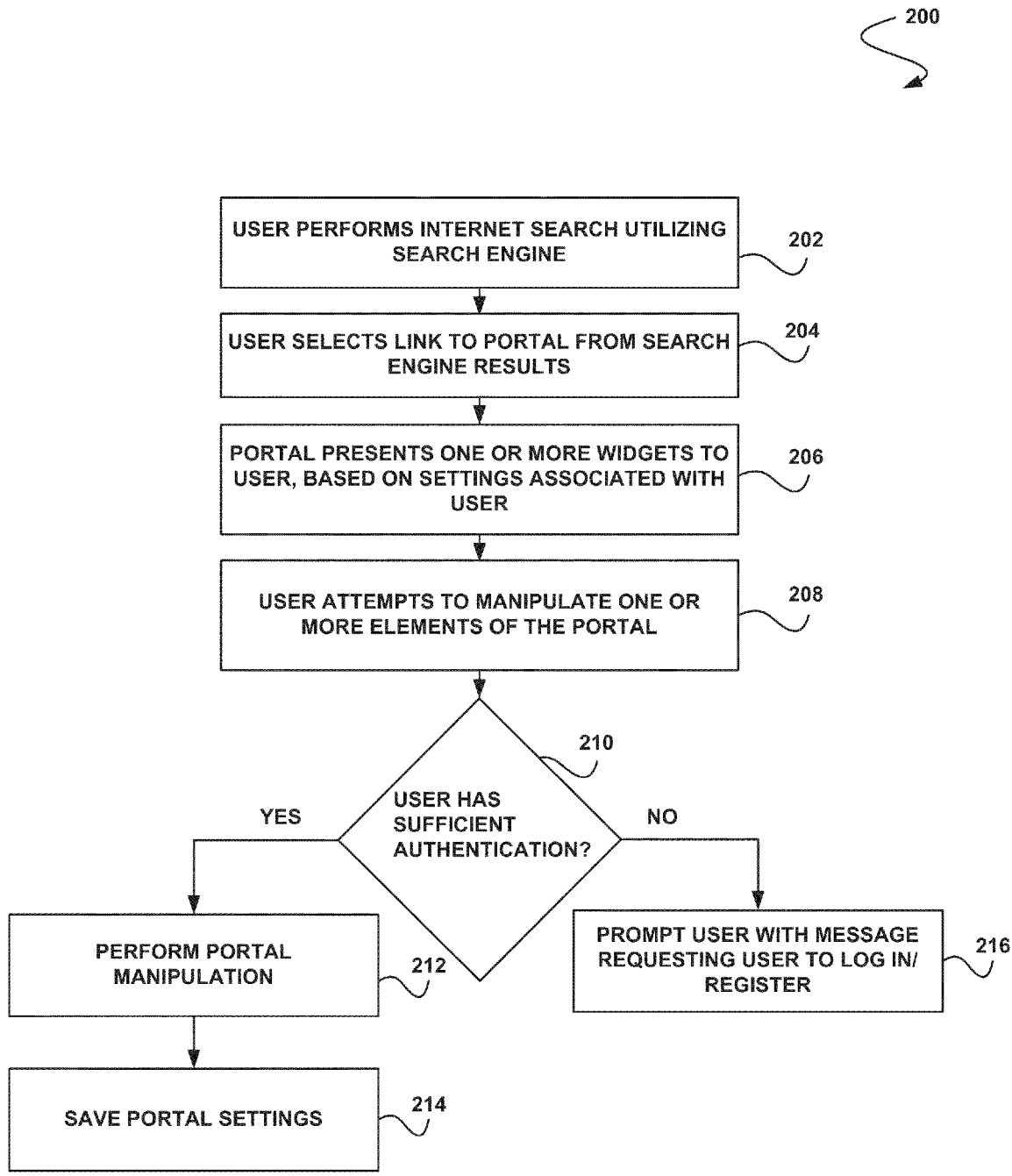
FIG. 2 illustrates a method for accessing and interacting with a portal, in accordance with another embodiment.

FIG. 2 illustrates a method 200 for accessing and interacting with a portal, in accordance with another embodiment. As an option, the method 200 may be carried out in the context of the functionality of FIG. 1. Of course, however, the method 200 may be carried out in any desired environment. The aforementioned definitions may apply during the present description.

As shown in operation 202, a user performs an internet search utilizing a search engine. In one embodiment, the user may perform the search by inputting a search query into a field of the search engine interface. Additionally, as shown in operation 204, the user selects a link to a portal from the search engine results. For example, the search engine may return multiple hyperlinks in response to the internet search, and the user may select one of the hyperlinks, where the selected hyperlink may direct the user to the portal.

Further, as shown in operation 206, the portal presents one or more widgets to the user, based on one or more settings associated with the user. In one embodiment, the settings may include data stored by the user's web browser (e.g., one or more cookies, etc.). In another embodiment, the settings may identify the user to the portal. In yet another embodiment, the portal may compare the identification of the user to one or more user portal profiles stored by the provider of the portal. Additionally, if the identification of the user matches an existing profile stored by the provider, the matching profile may be retrieved. If the identification of the user does not match an existing stored profile, then a default profile may be retrieved.

Further still, in one embodiment, the retrieved profile may be used to determine which widgets are displayed to the user within the portal. For example, a list of available widgets may be stored in a master table in association with the portal, and the retrieved profile may dictate which widgets from the list are to be displayed to the user within the portal. Additionally, one or more row and column coordinates may be stored within the retrieved portal for each widget displayed within the portal, such that each widget may be displayed to the user in the same manner that the user last viewed them. In another embodiment, the number of widgets presented to the user through the portal may be based on an authorization level of the user.

Also, in one embodiment, each of the widgets displayed to the user may retrieve information from one or more sources. For example, each widget may retrieve information from a database of the portal provider, from a web application call, from a knowledge base application, etc. In another embodiment, each of the widgets may retrieve information from the one or more sources after the portal has loaded. For example, each widget may display a "loading" indicator after the portal has loaded while the widget retrieves the information. In this way, the portal may be quickly loaded and presented to the user. In another example, a widget may cache the retrieved information. In yet another embodiment, each of the widgets may be displayed using a scripting language (e.g. Javascript®, etc.), and may retrieve information utilizing a platform (e.g., a Force.com® platform utilizing Apex® code, etc.).

Additionally, as shown in operation 208, the user attempts to manipulate one or more elements of the portal. In one embodiment, the user may attempt to manipulate the structure of the portal. For example, the user may click and drag one or more columns of the portal. In another example, the user may rearrange the order of one or more widgets displayed within the portal. In another embodiment, the user may attempt to add one or more widgets to the display area of the portal. For example, the portal may include a toolbar where the user may select one or more unused and/or new widgets to be displayed by the portal.

Further, in one embodiment, the user may attempt to remove one or more widgets displayed within the portal, minimize one or more widgets displayed within the portal, maximize one or more widgets displayed within the portal, etc. In another embodiment, the user may attempt to set a particular format for one or more categories of widgets. For example, one or more widgets may be grouped into a category based on common themes and/or patterns (e.g., list view, single view/edit, graph, etc.), and the user may attempt to set a format (e.g., a number of items listed, rows displayed, etc.) for the category.

Further still, in one embodiment, the user may attempt to view a different portion of a widget (e.g., by selecting a tab associated additional information provided by the widget, etc.). In another embodiment, the user may attempt to view an additional hierarchy associated with the widget (e.g., by clicking on an icon associated with the widget such that the widget expands to show hierarchical information, etc.).

Also, as shown in decision 210, it is determined whether the user has sufficient authorization to perform the attempted manipulation. In one embodiment, an authorization level may be associated with the user and may be stored within the user's local computer (e.g., as a cookie, etc.) and/or a server database associated with the provider of the portal (e.g., as a portal state custom object, etc). In another embodiment, this authorization level may be compared to the user's attempted manipulation. For example, this authorization level may be compared to the authorization level needed to add, remove, view, or otherwise manipulate data associated with one or more widgets (e.g., a widget's authorization level, etc.), the authorization level needed to perform one or more modifications to the portal, etc.

If it is determined in decision 210 that the user has sufficient authorization to perform the attempted manipulation, then in operation 212 the attempted manipulation is performed. In one embodiment, the portal may dynamically adjust in response to the performed manipulation. For example, the portal may automatically line up an added widget with other displayed widgets, and may automatically pull information needed by the widget from the data source after the attempt is authorized. In another example, the portal may push down existing information in order to display additional hierarchical information associated with a widget. In another embodiment, queries associated with the portal manipulation may be performed in bulk in order to minimize a consumption of system resources.

Additionally, as shown in operation 214, the portal settings associated with the portal manipulation are saved. In one embodiment, the settings may be saved to the user's local computer (e.g., as one or more cookies, etc.), to a server database, etc. In another embodiment, the settings may include toolbar settings, widget settings, portal arrangement settings, etc. In yet another embodiment, one or more actions of the user (e.g., a number of times the user opens a page of the portal, minimizes a widget of the portal, etc.) may be tracked and stored by the portal.

If it is determined in decision 210 that the user does not have sufficient authorization to perform the attempted manipulation, then in operation 216 the user is prompted with a message requiring the user to log in to or register with the provider of the portal. In this way, the user may be further authorized in order to determine whether the attempted manipulation may be carried out.

Further, in another embodiment, a purpose of the widget framework may be to allow the user to arrange a custom desktop with useful and relevant information for their needs. It may serve up dynamic content and reduce the need for a user to click to get value from the portal page. In yet another embodiment, the portal may include a user dashboard. In this way, value may be provided to different types of users through the availability of a wide variety of widgets.

Figure 3:
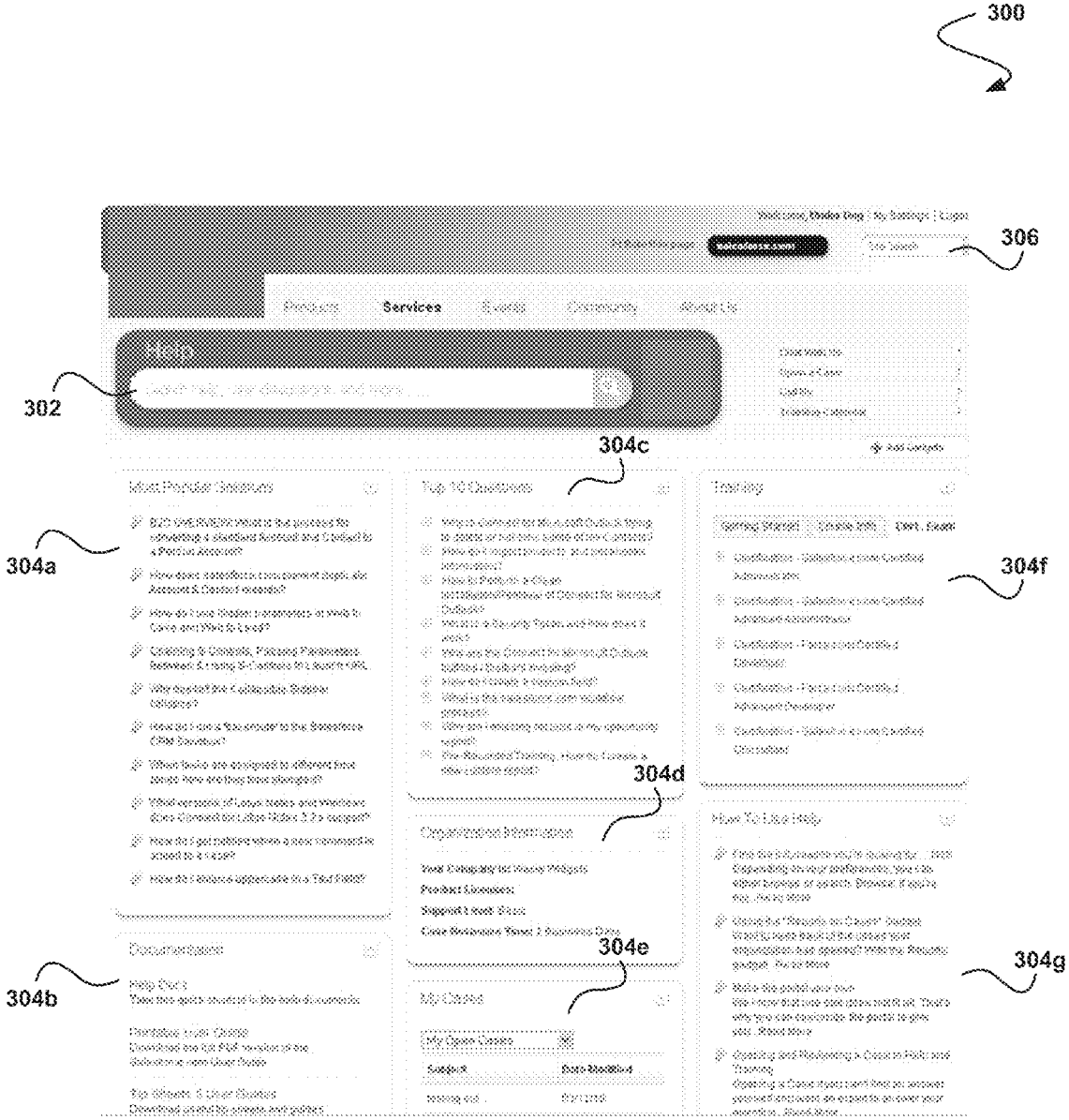
FIG. 3 illustrates an exemplary portal, in accordance with another embodiment.

FIG. 3 illustrates an exemplary portal 300, in accordance with another embodiment. As an option, the portal 300 may be implemented in the context of the functionality of FIGS. 1-2. Of course, however, the portal 300 may be carried out in any desired environment. The aforementioned definitions may apply during the present description.

As shown, the portal 300 includes a plurality of widgets 304a-g displayed within three columns of the body of the portal 300. Additionally, the portal 300 includes a help window 302. In one embodiment, a user of the portal 300 may input one or more keywords into the help window 302, and such keywords may be compared against a help database of the portal 300. Further, the portal 300 includes a site search window 306, where a user may input one or more keywords that are to be searched within the site of the provider of the portal 300.

Figure 4:
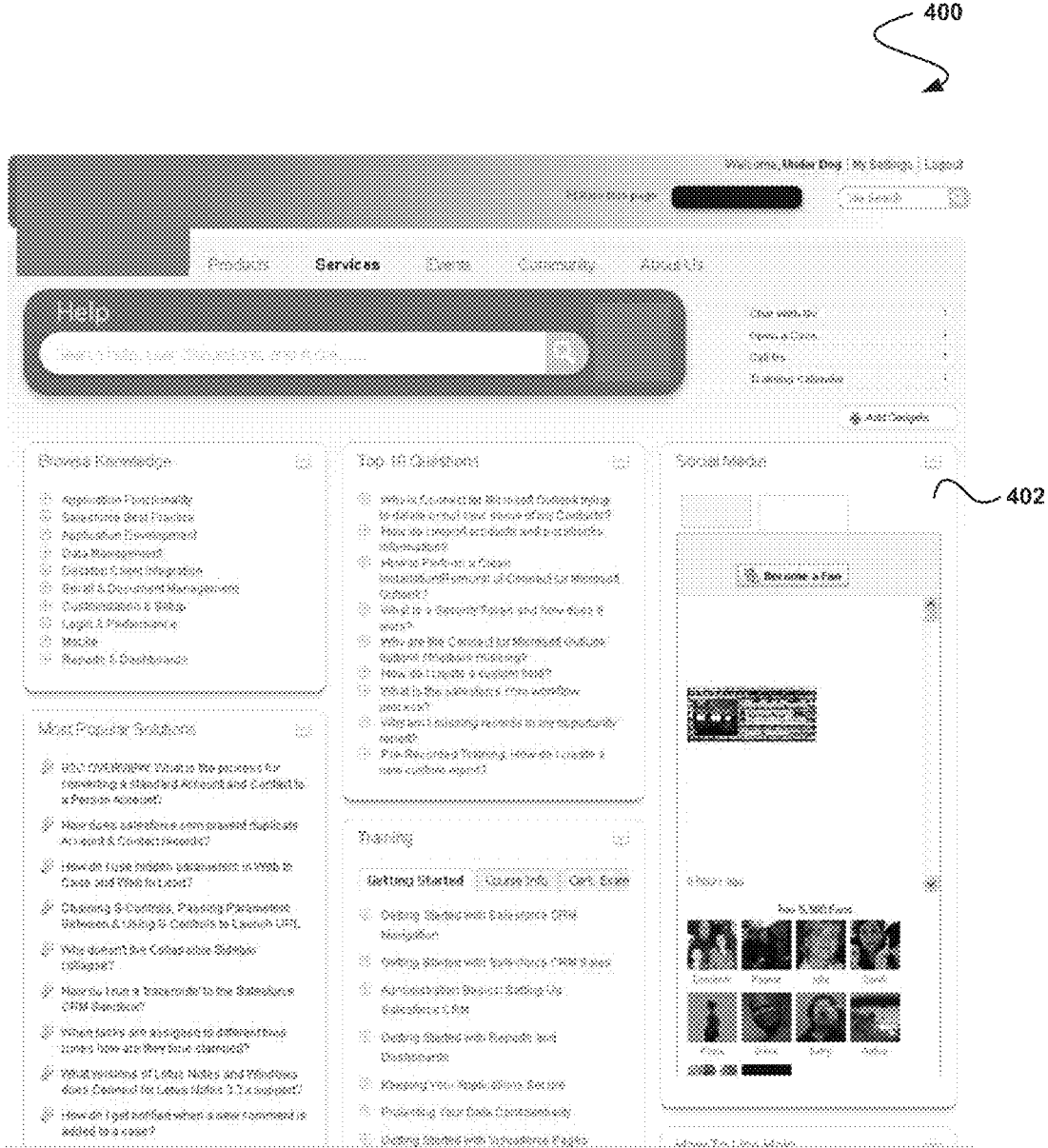
FIG. 4 illustrates another exemplary portal, in accordance with another embodiment.

FIG. 4 illustrates another exemplary portal 300, in accordance with another embodiment. As an option, the portal 400 may be implemented in the context of the functionality of FIGS. 1-3. Of course, however, the portal 400 may be carried out in any desired environment. The aforementioned definitions may apply during the present description.

As shown, the portal 400 includes a social media widget 402. In one embodiment, the social media widget 402 of the portal 400 may retrieve data from an external social media web site, and may display such retrieved data within the social media widget 402. In this way, a user may not have to leave the portal 400 in order to view data associated with a social media web site.

Figure 5:
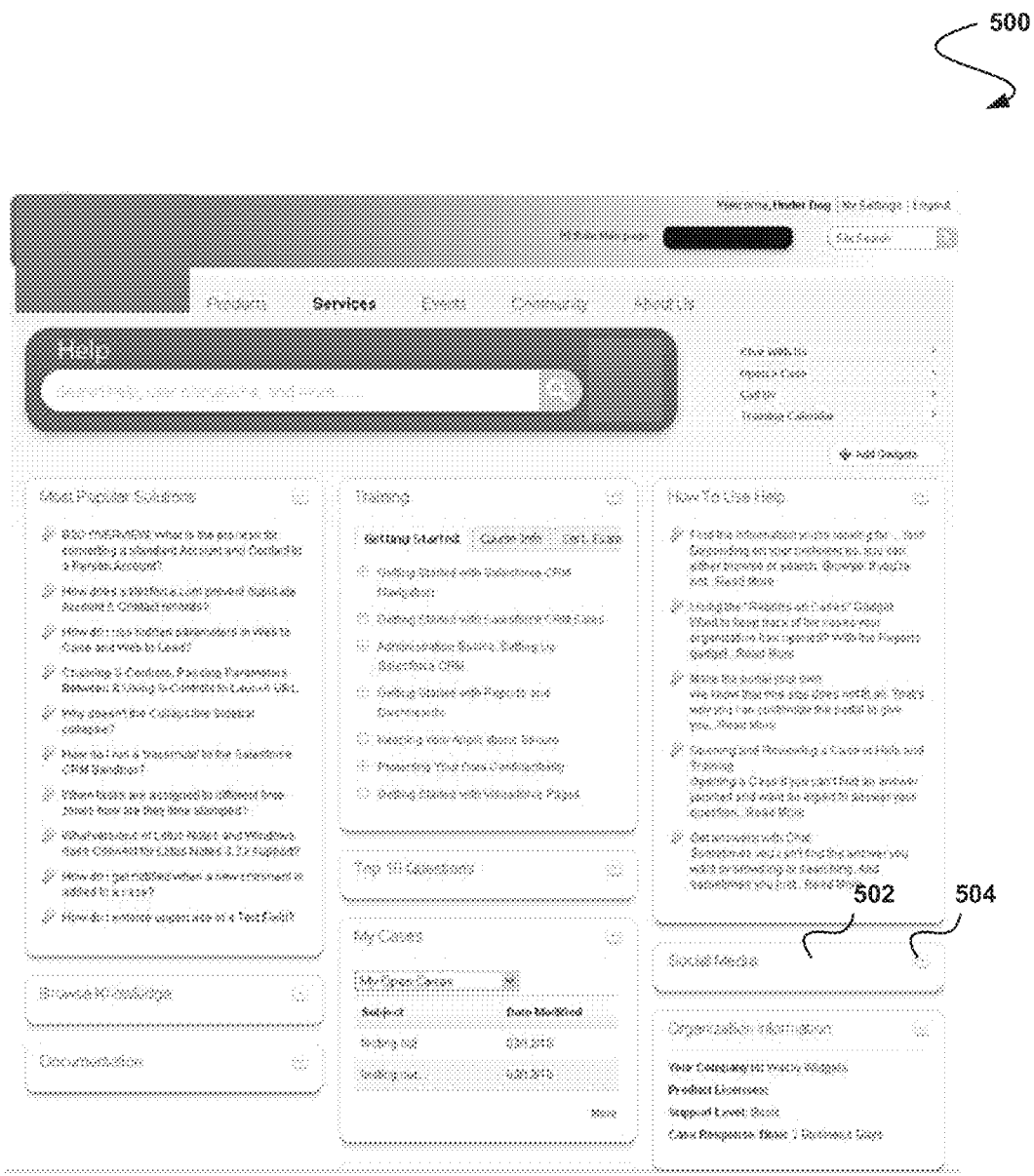
FIG. 5 illustrates another exemplary portal that is manipulated by a user, in accordance with another embodiment.

FIG. 5 illustrates another exemplary portal 500 that is manipulated by a user, in accordance with another embodiment. As an option, the portal 500 may be implemented in the context of the functionality of FIGS. 1-4. Of course, however, the portal 500 may be carried out in any desired environment. The aforementioned definitions may apply during the present description.

As shown, a social media widget 502 of the portal 500 has been minimized. In one embodiment, this minimization of the social media widget 502 may be performed by a user selecting an icon 504 within the social media widget 502. In this way, the user may manipulate the display of the widgets within the portal 500.

Figure 6:
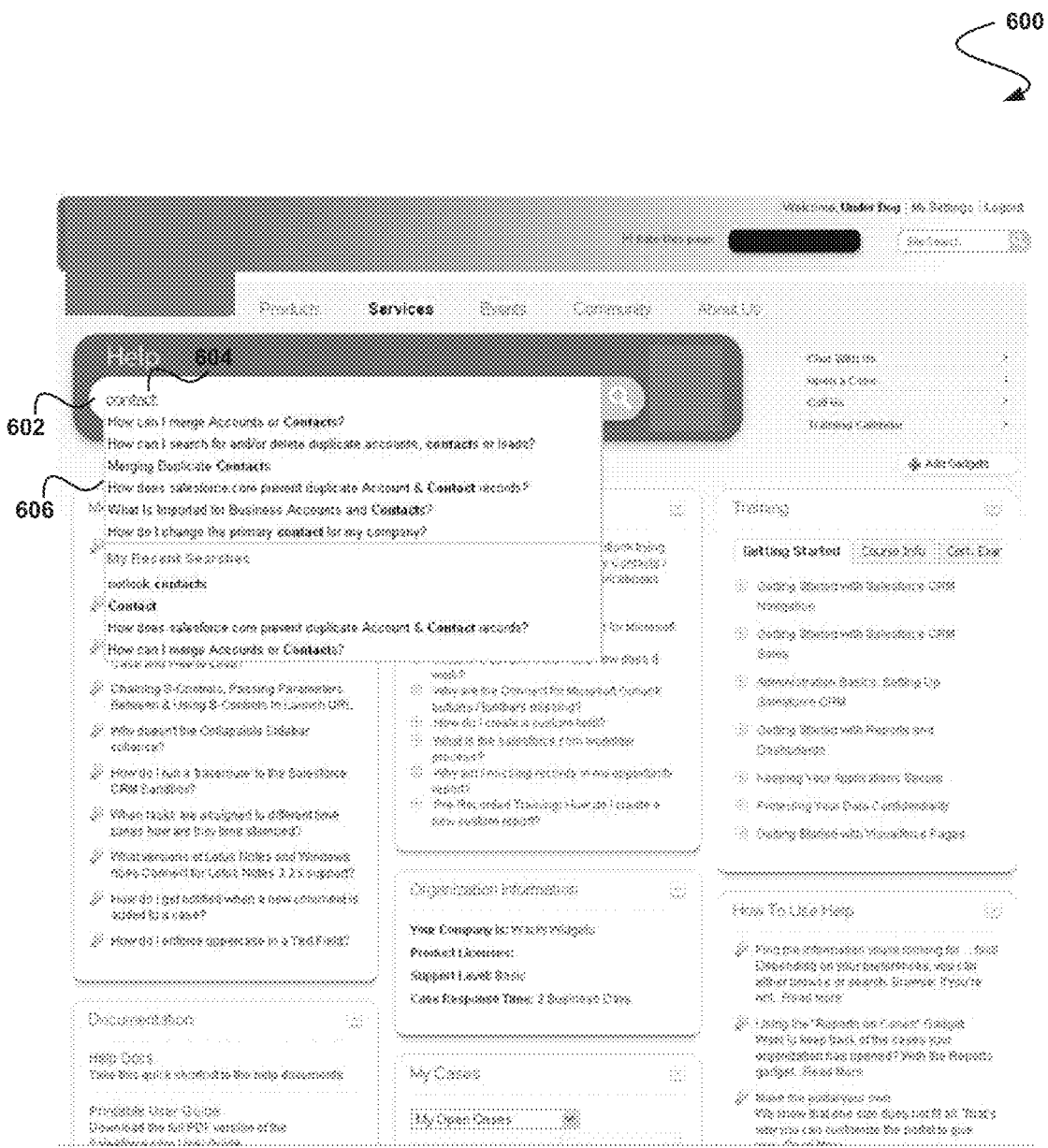
FIG. 6 illustrates another exemplary portal in which a help search is performed, in accordance with another embodiment.

FIG. 6 illustrates another exemplary portal 600 in which a help search is performed, in accordance with another embodiment. As an option, the portal 600 may be implemented in the context of the functionality of FIGS. 1-5. Of course, however, the portal 600 may be carried out in any desired environment. The aforementioned definitions may apply during the present description.

As shown, a search term 604 is entered into the help window 602 of the portal 600. As the search term 604 is entered into the help window 602, help search results 606 related to the input search term 604 are displayed within the portal 600. In this way, a user of the portal 600 may receive system assistance, widget help, keyword searching, etc. while using the portal 600.

System Overview

Figure 7:
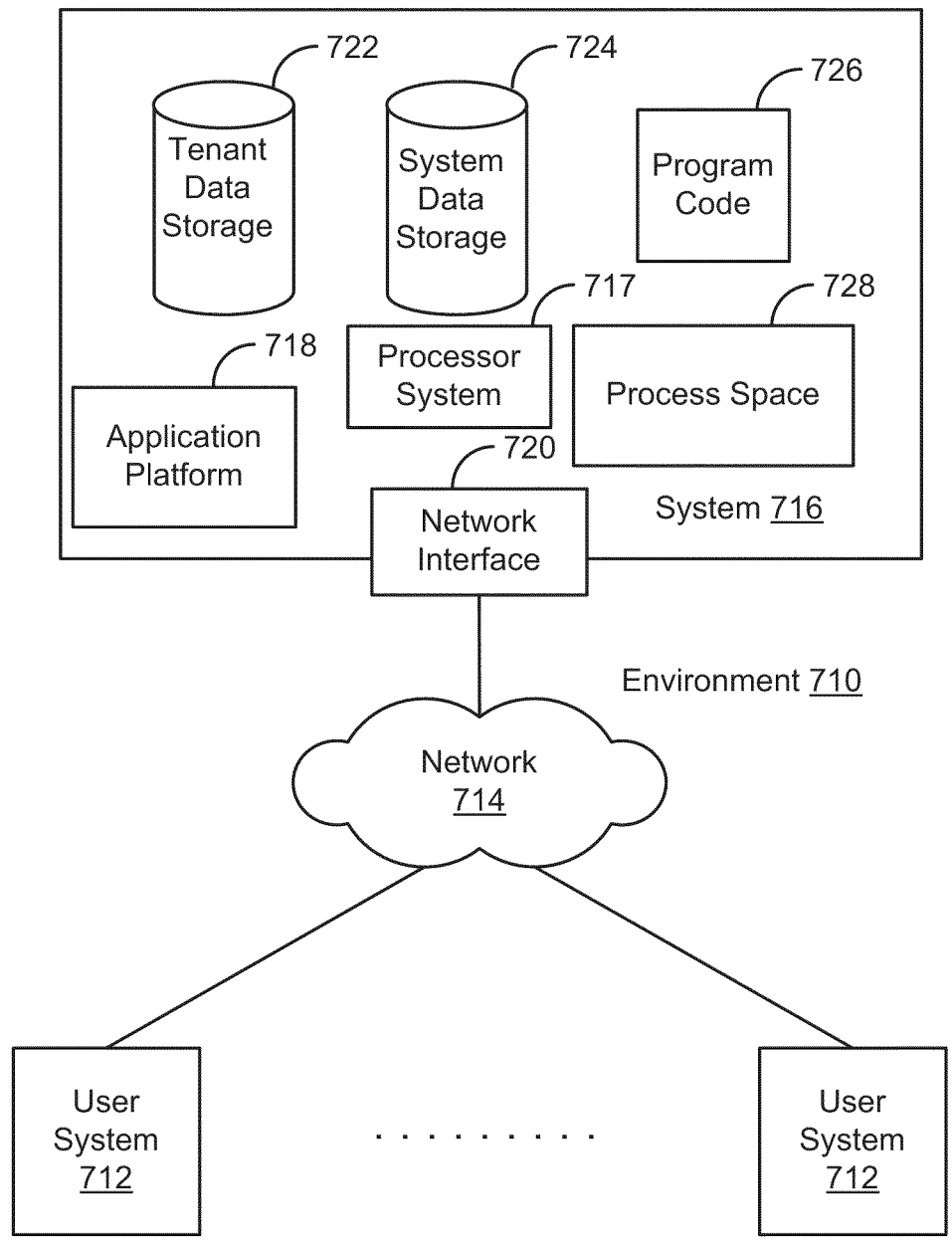
FIG. 7 illustrates a block diagram of an example of an environment wherein an on-demand database system might be used.

FIG. 7 illustrates a block diagram of an environment 710 wherein an on-demand database system might be used. Environment 710 may include user systems 712, network 714, system 716, processor system 717, application platform 718, network interface 720, tenant data storage 722, system data storage 724, program code 726, and process space 728. In other embodiments, environment 710 may not have all of the components listed and/or may have other elements instead of, or in addition to, those listed above.

Environment 710 is an environment in which an on-demand database system exists. User system 712 may be any machine or system that is used by a user to access a database user system. For example, any of user systems 712 can be a handheld computing device, a mobile phone, a laptop computer, a work station, and/or a network of computing devices. As illustrated in FIG. 7 (and in more detail in FIG. 8) user systems 712 might interact via a network 714 with an on-demand database system, which is system 716.

An on-demand database system, such as system 716, is a database system that is made available to outside users that do not need to necessarily be concerned with building and/or maintaining the database system, but instead may be available for their use when the users need the database system (e.g., on the demand of the users). Some on-demand database systems may store information from one or more tenants stored into tables of a common database image to form a multi-tenant database system (MTS). Accordingly, "on-demand database system 716" and "system 716" will be used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database system 716 may include an application platform 718 that enables creation, managing and executing one or more applications developed by the provider of the on-demand database system, users accessing the on-demand database system via user systems 712, or third party application developers accessing the on-demand database system via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, hut may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 7, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7 include conventional, well-known elements that are explained only briefly here. For example, each user system 712 could include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internet work of networks. However, it should be understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 716 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 8:
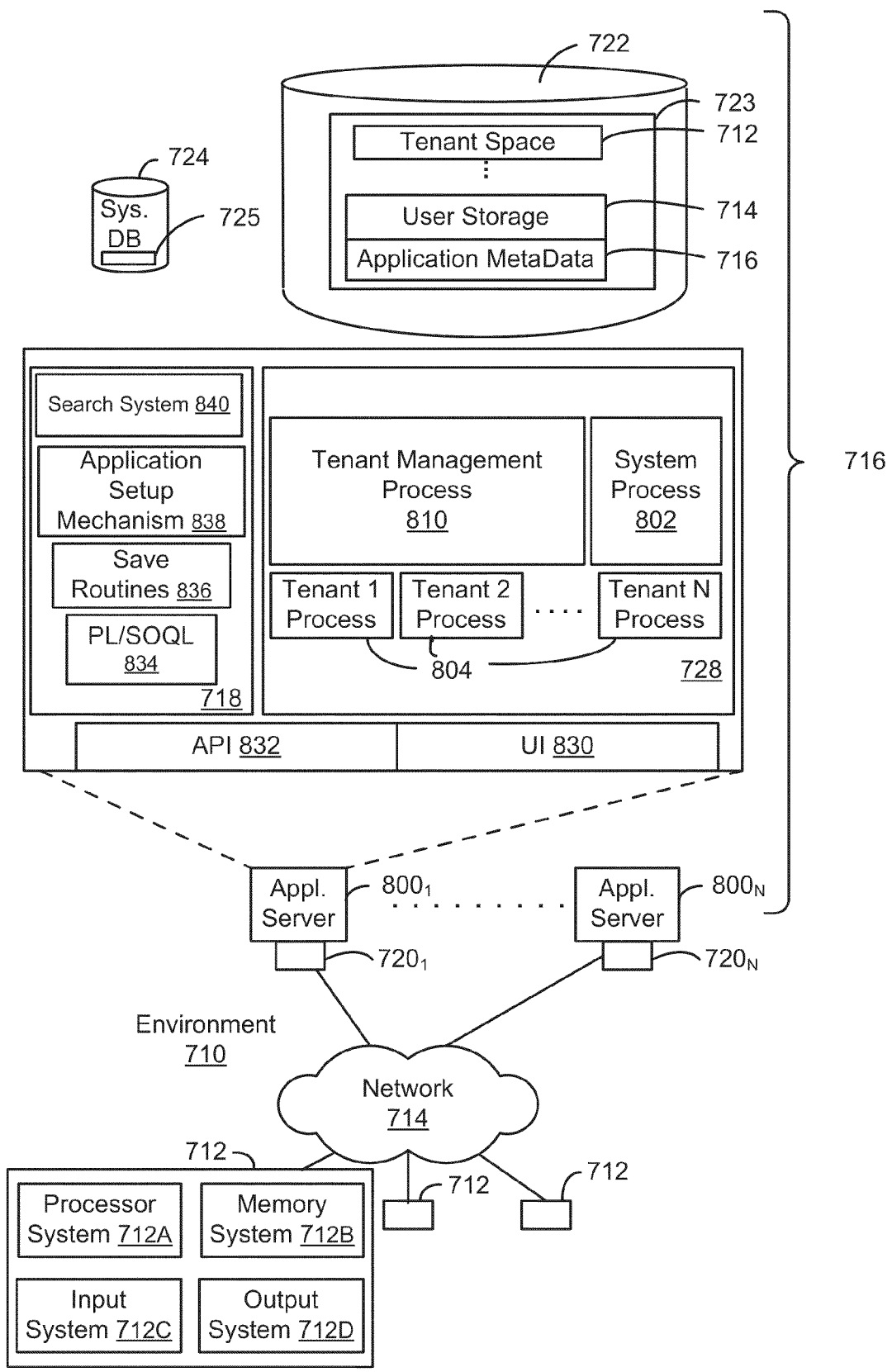
FIG. 8 illustrates a block diagram of an embodiment of elements of FIG. 7 and various possible interconnections between these elements.

FIG. 8 also illustrates environment 710. However, in FIG. 8 elements of system 716 and various interconnections in an embodiment are further illustrated. FIG. 8 shows that user system 712 may include processor system 712A, memory system 712B, input system 712C, and output system 712D. FIG. 8 shows network 714 and system 716. FIG. 8 also shows that system 716 may include tenant data storage 722, tenant data 723, system data storage 724, system data 725, User Interface (UI) 830, Application Program Interface (API) 832, PL/SOQL 834, save routines 836, application setup mechanism 838, applications servers $800_1$-$800_N$, system process space 802, tenant process spaces 804, tenant management process space 810, tenant storage area 812, user storage 814, and application metadata 816. In other embodiments, environment 710 may not have the same elements as those listed above and/or may have other elements instead of, or in addition to, those listed above.

User system 712, network 714, system 716, tenant data storage 722, and system data storage 724 were discussed above in FIG. 7. Regarding user system 712, processor system 712A may be any combination of one or more processors. Memory system 712B may be any combination of one or more memory devices, short term, and/or long term memory. Input system 712C may be any combination of input devices, such as one or more keyboards, mice, trackballs, scanners, cameras, and/or interfaces to networks. Output system 712D may be any combination of output devices, such as one or more monitors, printers, and/or interfaces to networks. As shown by FIG. 8, system 716 may include a network interface 720 (of FIG. 7) implemented as a set of HTTP application servers 800, an application platform 718, tenant data storage 722, and system data storage 724. Also shown is system process space 802, including individual tenant process spaces 804 and a tenant management process space 810. Each application server 800 may be configured to tenant data storage 722 and the tenant data 723 therein, and system data storage 724 and the system data 725 therein to serve requests of user systems 712. The tenant data 723 might be divided into individual tenant storage areas 812, which can be either a physical arrangement and/or a logical arrangement of data. Within each tenant storage area 812, user storage 814 and application metadata 816 might be similarly allocated for each user. For example, a copy of a user's most recently used (MRU) items might be stored to user storage 814. Similarly, a copy of MRU items for an entire organization that is a tenant might be stored to tenant storage area 812. A UI 830 provides a user interface and an API 832 provides an application programmer interface to system 716 resident processes to users and/or developers at user systems 712. The tenant data and the system data may be stored in various databases, such as one or more Oracle™ databases.

Application platform 718 includes an application setup mechanism 838 that supports application developers' creation and management of applications, which may be saved as metadata into tenant data storage 722 by save routines 836 for execution by subscribers as one or more tenant process spaces 804 managed by tenant management process 810 for example. Invocations to such applications may be coded using PL/SOQL 834 that provides a programming language style interface extension to API 832. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 816 for the subscriber making the invocation and executing the metadata as an application in a virtual machine.

Each application server 800 may be communicably coupled to database systems, e.g., having access to system data 725 and tenant data 723, via a different network connection. For example, one application server $800_1$ might be coupled via the network 714 (e.g., the Internet), another application server $800_{N-1}$ might be coupled via a direct network link, and another application server $800_N$ might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 Big-IP load balancer) is communicably coupled between the application servers 800 and the user systems 712 to distribute requests to the application servers 800. In one embodiment, the load balancer uses a least connections algorithm to route user requests to the application servers 800. Other examples of load balancing algorithms, such as round robin and observed response time, also can be used. For example, in certain embodiments, three consecutive requests from the same user could hit three different application servers 800, and three requests from different users could hit the same application server 800. In this manner, system 716 is multi-tenant, wherein system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 800 to request and update system-level and tenant-level data from system 716 that may require sending one or more queries to tenant data storage 722 and/or system data storage 724. System 716 (e.g., an application server 800 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product, comprising a non-transitory computer usable medium having a computer readable program code embodied therein, the computer readable program code adapted to be executed to cause a computer to implement a method for performing actions associated with a portal, the method comprising:
receiving a request from a user to view a portal;
identifying a profile of the user from which the request was received;
determining a portion of portal content available based on the identified profile of the user;
providing to the user the portion of the portal content;
after providing the portion of the portal content to the user, receiving a request to manipulate the portion of the portal content from the user via the portal, wherein the requested manipulation of the portion of the portal content includes at least one of an addition to, a removal of, and a rearrangement of the portion of the portal content;
in response to receiving the request to manipulate the portion of the portal content, determining whether the user is authorized to perform the requested manipulation of the portion of the portal content by comparing an authorization level of the user with an authorization level associated with the requested manipulation of the portion of the portal content; and
performing the requested manipulation of the portion of the portal content when it is determined, based on the comparison, that the user is authorized to perform the requested manipulation of the portion of the portal content.

2. The computer program product of claim 1, wherein the request to view the portal includes login data associated with the user.

3. The computer program product of claim 1, wherein the request to view the portal includes a selection of a link that is provided to the user by a search engine as a result of a query input by the user into the search engine.

4. The computer program product of claim 1, wherein the portal is provided by a multi-tenant on-demand database system.

5. The computer program product of claim 1, wherein providing to the user the portion of the portal content includes requesting and retrieving data from one or more sources, which is then presented to the user by the portal.

6. The computer program product of claim 5, wherein the retrieved data includes user data retrieved from a database associated with an account of the user.

7. The computer program product of claim 1, wherein the portal includes one or more widgets that are displayed through the portal.

8. The computer program product of claim 7, wherein the portal includes a plurality of columns, and each widget is located within one of the plurality of columns.

9. The computer program product of claim 7, wherein one of the widgets displayed through the portal displays data retrieved from a social media source.

10. The computer program product of claim 7, wherein one of the widgets displayed through the portal displays data associated with a knowledge base.

11. The computer program product of claim 7, wherein one of the widgets displayed through the portal displays frequently asked questions (FAQs) associated with a system.

12. The computer program product of claim 7, wherein the widgets are displayed to the user through the portal based on one or more privileges associated with the user.

13. The computer program product of claim 12, wherein only widgets that correspond to an access score of the user's are displayed to the user through the portal.

14. The computer program product of claim 7, wherein the widgets are loaded within the portal after the portal is loaded.

15. The computer program product of claim 1, further comprising receiving user input that includes one or more of the user selecting one or more widgets within the portal utilizing an icon of a GUI, dragging and dropping one or more widgets within the portal, and selecting one or more icons within one or more widgets.

16. The computer program product of claim 1, further comprising displaying information within a widget of the portal.

17. The computer program product of claim 1, further comprising saving one or more preferences associated with the requested manipulation.

18. A method, comprising:
receiving a request from a user to view a portal;
identifying a profile of the user from which the request was received;
determining a portion of portal content available based on the identified profile of the user;
providing to the user, utilizing a processor, the portion of the portal content;
after providing the portion of the portal content to the user, receiving a request to manipulate the portion of the portal content from the user via the portal, wherein the requested manipulation of the portion of the portal content includes at least one of an addition to, a removal of, and a rearrangement of the portion of the portal content;
in response to receiving the request to manipulate the portion of the portal content, determining whether the user is authorized to perform the requested manipulation of the portion of the portal content by comparing an authorization level of the user with an authorization level associated with the requested manipulation of the portion of the portal content; and
performing the requested manipulation of the portion of the portal content when it is determined, based on the comparison, that the user is authorized to perform the requested manipulation of the portion of the portal content.

19. An apparatus, comprising:
a processor for:
receiving a request from a user to view a portal;
identifying a profile of the user from which the request was received;
determining a portion of portal content available based on the identified profile of the user;
providing to the user the portion of the portal content;

after providing the portion of the portal content to the user, receiving a request to manipulate the portion of the portal content from the user via the portal, wherein the requested manipulation of the portion of the portal content includes at least one of an addition to, a removal of, and a rearrangement of the portion of the portal content;

in response to receiving the request to manipulate the portion of the portal content, determining whether the user is authorized to perform the requested manipulation of the portion of the portal content by comparing an authorization level of the user with an authorization level associated with the requested manipulation of the portion of the portal content; and performing the requested manipulation of the portion of the portal content when it is determined, based on the comparison, that the user is authorized to perform the requested manipulation of the portion of the portal content.

20. The computer program product of claim 1, wherein the identified profile is a default profile that is identified in response to an identification of the user not matching a stored existing profile.

\* \* \* \* \*